March 1, 1966 A. THALMANN 3,237,251
METHOD AND A DEVICE FOR CONTINUOUS CASTING
Filed Oct. 30, 1962 14 Sheets-Sheet 1

March 1, 1966  A. THALMANN  3,237,251

METHOD AND A DEVICE FOR CONTINUOUS CASTING

Filed Oct. 30, 1962  14 Sheets-Sheet 2

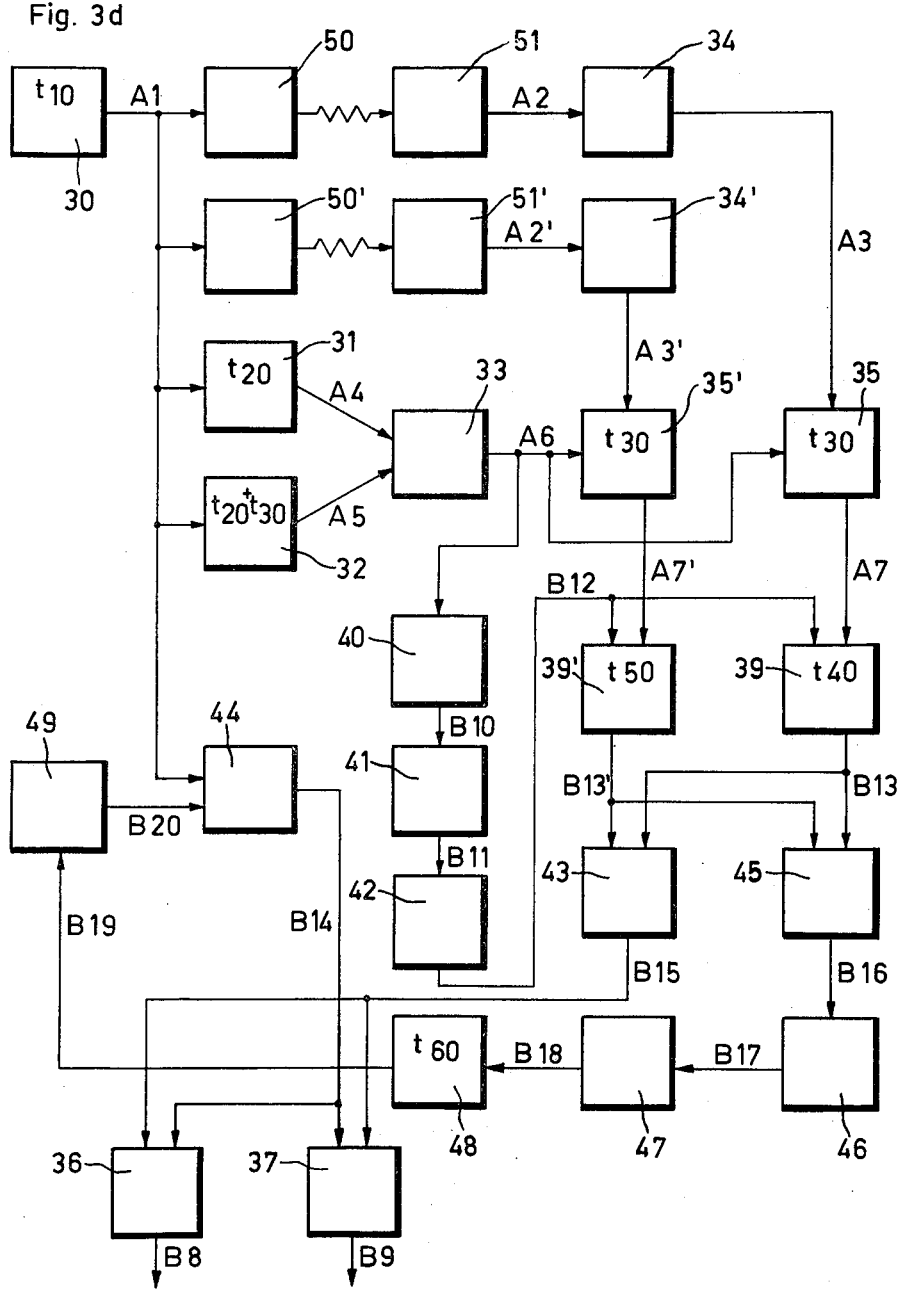

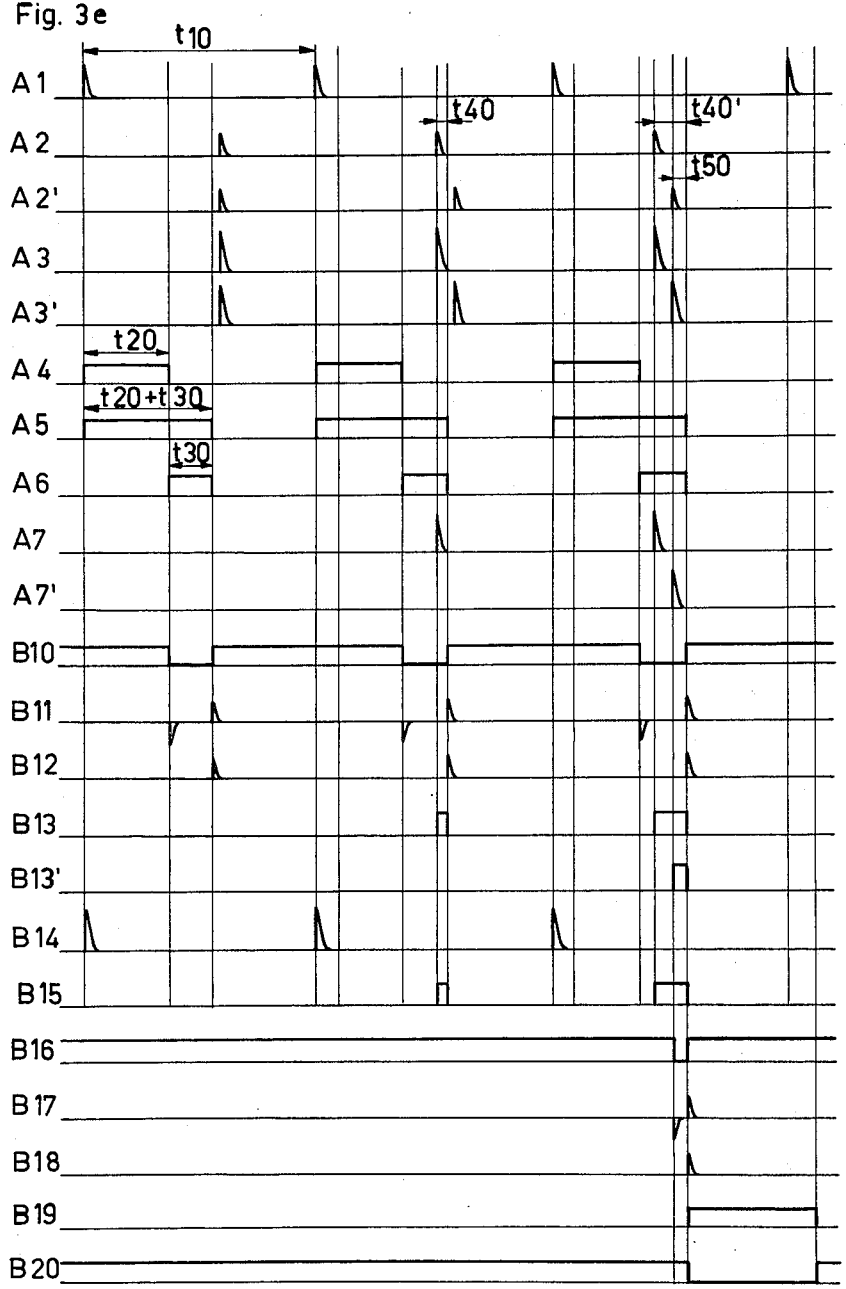

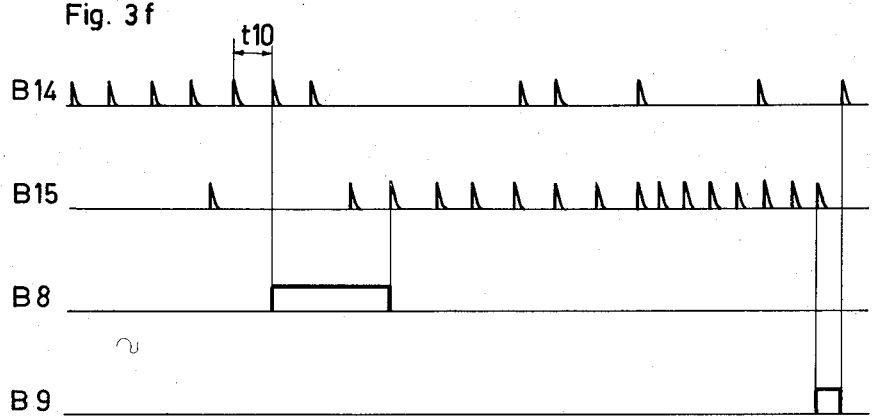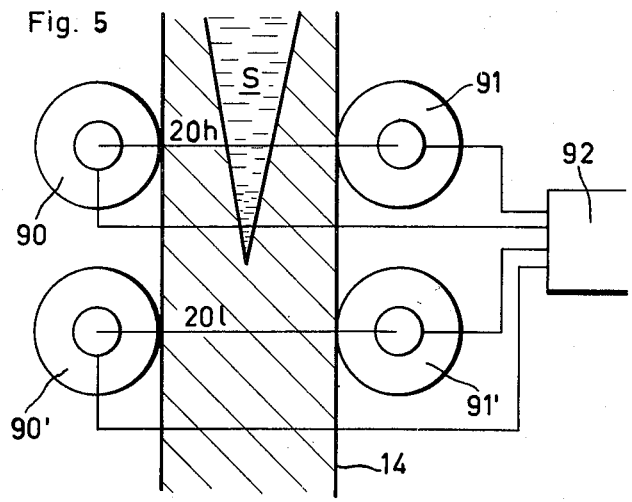

March 1, 1966 A. THALMANN 3,237,251
METHOD AND A DEVICE FOR CONTINUOUS CASTING
Filed Oct. 30, 1962 14 Sheets-Sheet 8
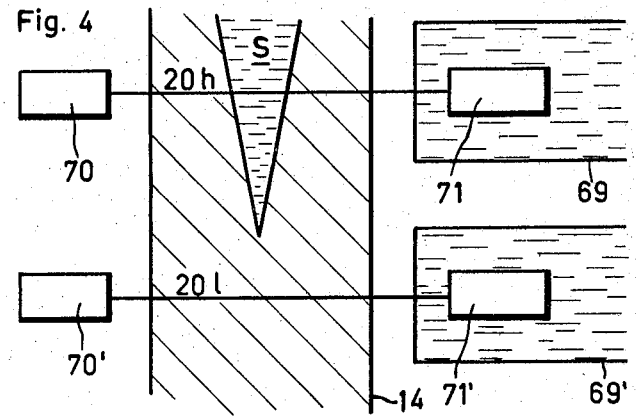
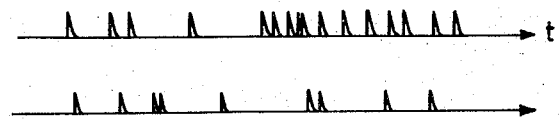
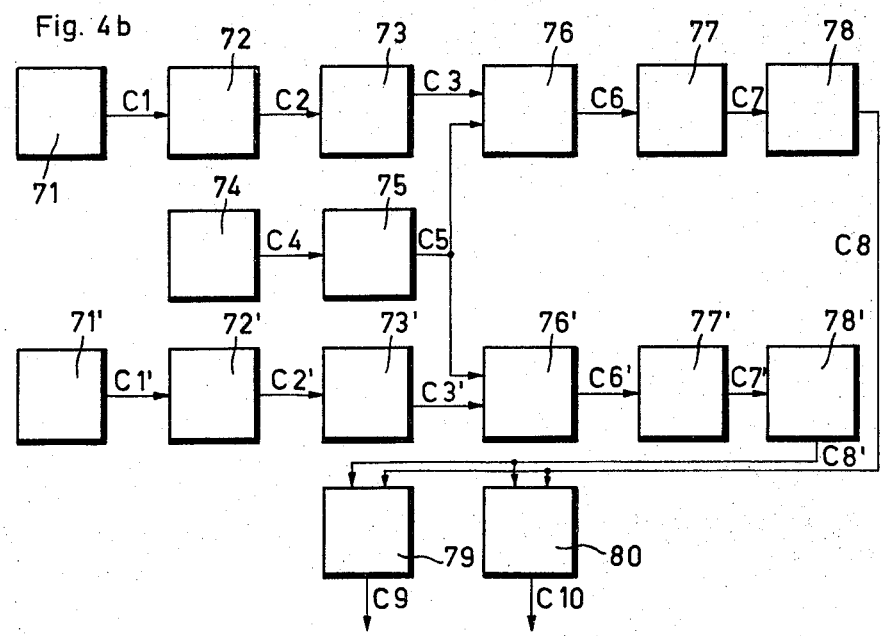

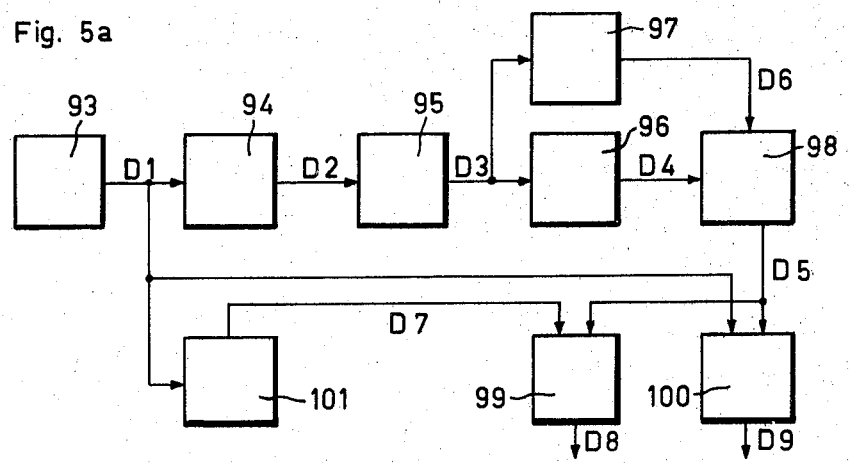
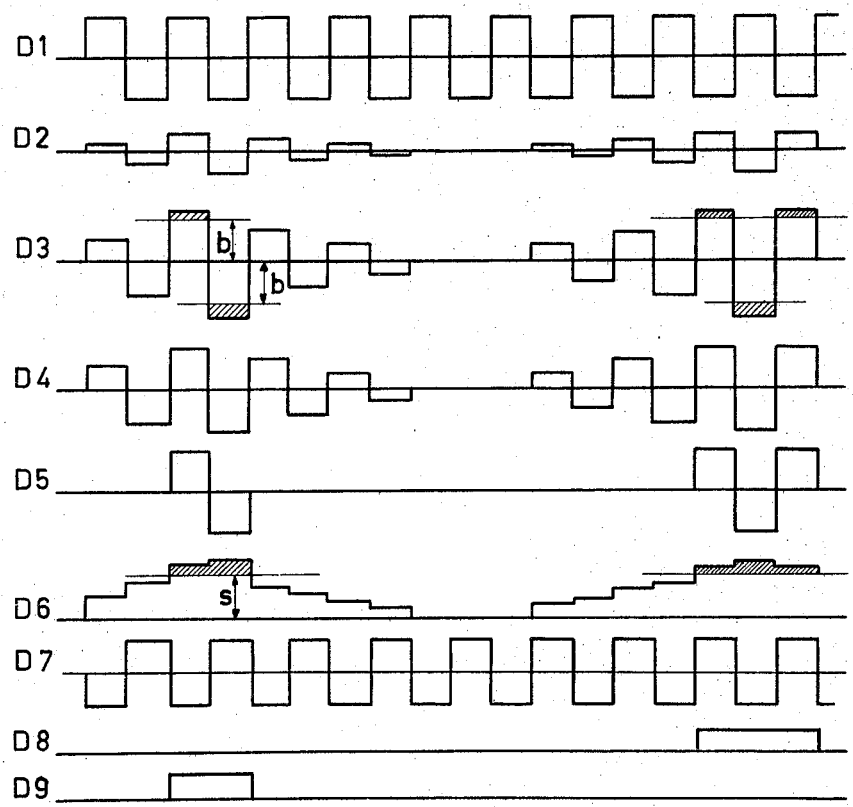

March 1, 1966   A. THALMANN   3,237,251
METHOD AND A DEVICE FOR CONTINUOUS CASTING
Filed Oct. 30, 1962   14 Sheets-Sheet 12

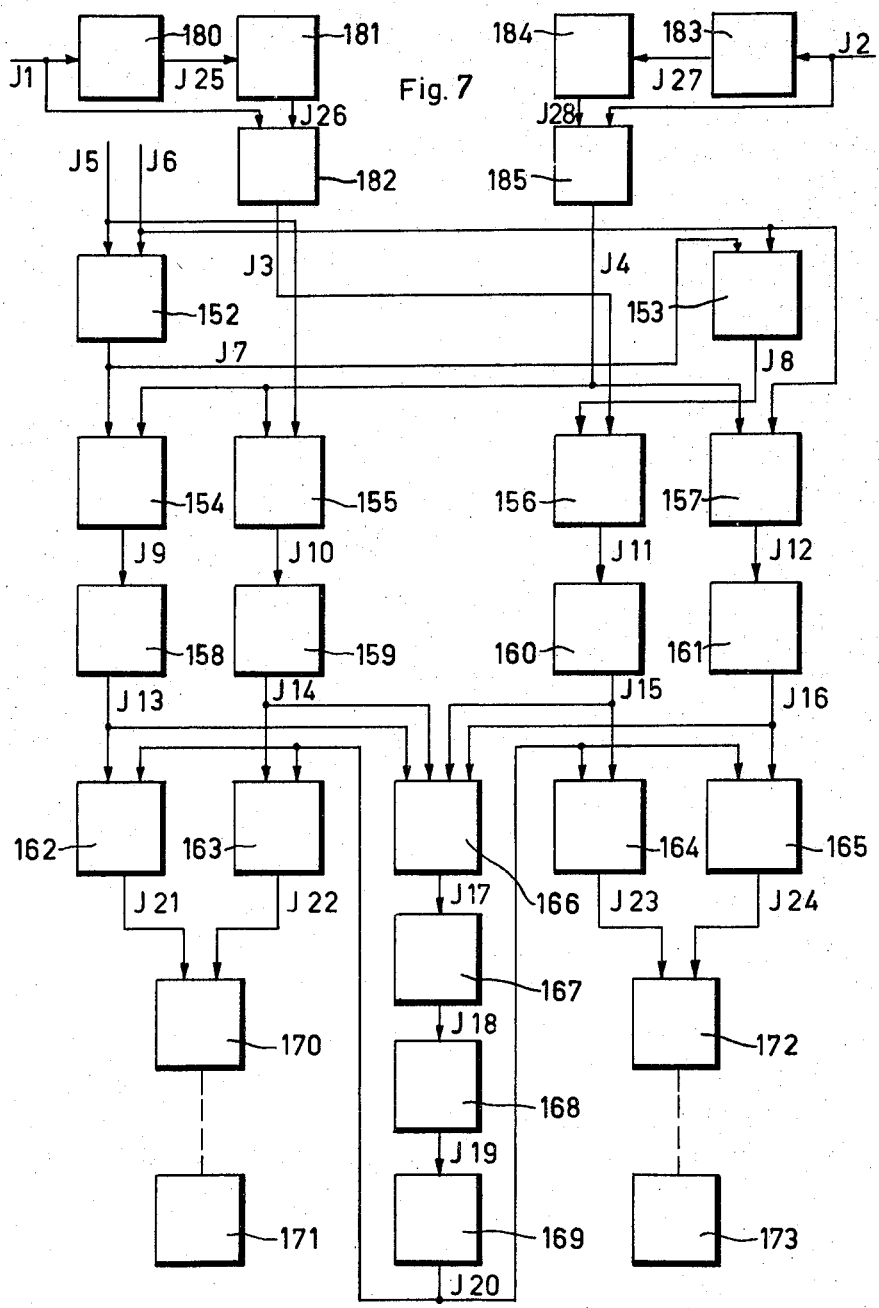

United States Patent Office 3,237,251
Patented Mar. 1, 1966

3,237,251
METHOD AND A DEVICE FOR
CONTINUOUS CASTING
Armin Thalmann, Uster, Zurich, Switzerland, assignor to
Concast AG., Zurich, Switzerland
Filed Oct. 30, 1962, Ser. No. 234,096
Claims priority, application Switzerland, Nov. 3, 1961,
12,757/61
12 Claims. (Cl. 22—57.2)

The output of a continuous casting machine depends from the material and the section to be cast, from the quality thereof, the heat absorption capacity of the plant etc. By means of known empirical figures, it is possible to determinate the values for the required cooling and for the optimum casting speed. The depth of the liquid metal core or pool thereby represents a measure for these values.

If the casting speed and the cooling are constant, then theoretically the level of the lowermost point of the liquid core, i.e. the core tip should always be the same. But reduction of the casting temperature during the casting operation, the adjustment of the lowering speed due to modifications in the feed of the liquid casting material and other factors may, however, modify the level or cote of the core tip. If now, for example, the distance separating the core tip from the level of the liquid metal increases owing to these modifications and reaches beyond the withdrawing rolls the danger appears in plants cutting the strand immediately after its passage through the withdrawing roll, of cutting through the liquid core, which by flowing out may put the machine out of operation for a longer period and may be the source of accidents.

Also if the distance between the core tip and the level of the liquid metal is too large the solidified external zone of the strand may be too thin after the latter has left the mould, which may lead to the feared break outs which also put the machine out of operation.

In order to prevent these drawbacks as far as possible, and to obtain a safety margin the operators tend to reduce the lowering speed. Since, up to now, however, there is no system known to ascertain the exact position of the core tip during the casting in direction transversal to the strand axis it is necessary to select this safety margin large enough to cover all uncertainties. This leads to a substantial reduction of the output or efficiency of the plant. But not only this reduction in the efficiency of the plant has negative results on the costs but also the height of the constructions which are required in the planning of continuous casting machines in order to have sufficient distance between the mould and the presumed end of the liquid core plus a safety margin so as to obtain a sufficient solidification reserve. This height of the construction makes necessary higher construction of the complete continuous casting machine and consequently of the building housing this machine.

There is a method known for ascertaining the lower end of the liquid core by determinating the border between the completely solidified and the liquid metal by echo sounding in longitudinal direction of the strand. Since, however, the apparatus for emitting and receiving the echo pulses must be arranged at the free end of the strand this method is not adapted for continual ascertaining of the core tip and consequently it cannot be used for direct control and improvement of the efficiency of a continuous casting machine.

The latter is the prime object of the present invention besides the increase of safety of the working of a continuous casting machine.

To this end the present invention contemplates a method for continuous casting comprising the steps of ascertaining, during the casting operation and in a range in which the core tip is required to be in accordance with the requirements of the desired material, the quality and the size of the strand, at least periodically whether the strand in this range comprises one (solid) or two (solid/liquid) states of aggregation and of using the obtained values for controlling the machine in the sense of these requirements.

Such a method makes possible for an optimum use of the possible output of the plant by not only ascertaining the depth of the liquid core and thus the position of the core tip but in addition thereto by using the ascertained values directly, if the means for ascertaining the aggregate states are constructed in such manner that they produce signals adapted to control the machine. Advantageously these values are continually ascertained in the course of the casting in the strand passing-by. The mentioned range may be directly a predetermined level or cote, whereby the arrangement is such that if this cote is exceeded in any direction, the machine is controlled so that the height of the core is lengthened or shortened, i.e. the position of the core tip is raised or lowered. A small range about the selected cote may, particularly in machines capable of high casting speed, lead to a certain unstability of the control, which in turn results in a rather high number of modifications of the controlled values of the machine. For such cases it would be advantageous if the control had a certain inertness. Such inertness may be obtained by increasing the range about the selected cote and in direction of the strand axis for example ±0.5 m., whereby the aggregate states in the strand are ascertained at the limit of this range.

The values ascertained in this manner for the position of the core tip, i.e. the corresponding signals may be used for controlling the withdrawal speed, the cooling intensity or both these factors. It is, however, also possible to control therewith other factors, for example to influence thereby the degree of oxidation in the casting of rimmed steel, the supply of the metal, etc.

In the selected range, waves, electrical current or rays are sent transversally through the strand and made to give indications in form of signals about the states of aggregation of the material traversed thereby.

It is well known that the electrical conductivity of material, e.g. of steel, is different whether this material is in solid or liquid state. If now, in the mentioned range, an electrical current is sent perpendicularly to the axis of the strand through the latter the differences of the conductivity may be ascertained by corresponding electrical means and the signals obtained thereby may serve to control the machine.

Radioactive rays, for example gamma-rays have the property to be responsive to the density of a material. If, still in the mentioned range, an emitter is arranged on one side of the strand while opposite thereof there is arranged a receiver, a difference in the received intensity will appear on the receiving side due to the different densities of the liquid and of the solid material. This difference may be transformed into signals adapted to control the machine.

For localizing the aggregate states, it is also possible to use waves, whereby waves of high frequency such as for example waves produced by ultrasonic emitters, are particularly appropriate. An ultrasonic emitter placed in the selected range on one side of the strand emits high frequency waves transversally to the casting axis. These waves are reflected at the points of transition from solid to liquid. This reflection generally designated by echo is received in a receiver placed on the same side of the strand. The time interval between the emission of the pulses and their reception, constitutes an indication for the point of reflection. Such time intervals may be ascertained and signals thereof may serve to control the machine.

Moreover, it is possible to localize the lowest point of the liquid core by letting the waves pass through the strand (method of penetration). According to this method an emitter is placed in the selected range on one side of the strand and a receiver is placed in the same range but opposite to the emitter with respect to the strand. By measuring the time required by the ultrasonic waves for passing through the strand it is possible to localize the points of transition from solid to liquid in the strand. Again then these points may be transformed into signals adapted to be used for controlling the machine.

Practice has shown, however, that ultrasonic devices are sensitive to high temperatures, so that a direct coupling of such devices to the hot strand cannot be envisaged. Therefore it is proposed to place the ultrasonic emitter and the ultrasonic receiver within water-cooled rollers pressed against the strand whereby the cooling water may serve as coupling liquid between the wave emitter and the rollers. The transmission of the waves from the rollers to the strand is effected by direct contact between these two parts. However, the scale appearing on the surface of the strand may to a certain extent hinder such transmission of the ultrasonic waves into the strand. This may be prevented by guiding a part of the cooling water serving to the direct cooling of the strand between the strand and the roller. This cooling water then serves as a coupling liquid between the strand and the rollers.

A further possibility of coupling the ultrasonic waves may consist in the use of a jet of water under pressure between the emitter and the receiver on the one hand and the hot strand on the other hand. This jet is directed to impact perpendicularly onto the strand with a pressure that makes the water pierce through the vaporous layer on the casting surface to be described hereinafter, due to the kinetic energy imparted to the jet by this pressure.

It is well known that a layer of vapor is produced between a surface of high temperature and a liquid. This is generally known under the designation of phenomenon of Leidenfrost. This vapor layer on the casting surface may render impossible the transmission of the ultrasonic waves from the coupling liquid to the casting. It is possible to reduce this insulating vapor layer by applying a voltage between the liquid and the hot surface.

It has been mentioned above that the depth of the liquid core is a function of different values. Therefore the range of the core tip may change in accordance with the requirements. Preferably for this reason the means for ascertaining the aggregate states are arranged to be adjustable in a direction parallel to the strand axis.

As a material solidifies there is generally no sharp border between the liquid and the solid state. In the zone of the core tip for example, it is possible that dendrites that have grown in direction towards the center of the strand at a same level contact each other. The solid bridges that are produced in this manner interrupt the continuity of the liquid core. This irregular border of course results in irregularities of the values obtained for the aggregate states. These irregularities in turn lead to a certain instability of the control that even may result in permanent modifications of the adjusting functions. Such instability of the control may be prevented by controlling the machines by the ascertained values in preadjustable intervals only. The latter may be obtained, for example, by ascertaining the said values at regular time intervals only. Also it is possible to release by these values a time element that in turn releases a signal for controlling the machine after its proper delay time only. Further it is possible to feed the ascertained values to a counting device that releases a signal to the control of the machine after a pre-selected value has been attained.

With the measured values it is possible to influence the adjusting functions. However, the requirements of the material may ask for further parameters influencing the adjustment to be considered. Such parameters are the temperature of the casting surface, the temperature of the liquid metal previous to its arrival into the die, etc. The measured actual values of these parameters may again be compared with appropriate nominal values in order to influence, by means of appearing deviations the control of the machine by the deviations of the actual from the nominal skin thickness.

Other features and advantages of the invention will become apparent from the description, now to follow, of preferred embodiments thereof, given by way of example only, and in which reference will be made to the accompanying drawings, in which:

FIGURE 1 diagrammatically illustrates a continuous casting machine;

FIGURE 3d is a block diagram illustrating the production of control pulses according to the method of penetration;

FIGURE 3e shows forms of signals;

FIGURE 3f shows forms of signals with reduced time axis;

FIGURE 4 illustrates the arrangement of emitter and receiver in the method using gamma-rays penetrating the strand and including two detection barriers;

FIGURE 4a shows a sequence of pulses;

FIGURE 4b is a block diagram illustrating the production of control pulses according to the gamma-ray method;

FIGURE 5 illustrates a method using electrical resistance and including two detection barriers;

FIGURE 5a is a block diagram illustrating the production of control pulses according to the electrical resistance method;

FIGURE 5b shows forms of signals;

FIGURE 7 is a block diagram illustrating the evaluation of the signals according to FIGURES 4 and 5.

FIGURE 1

Figure 1:
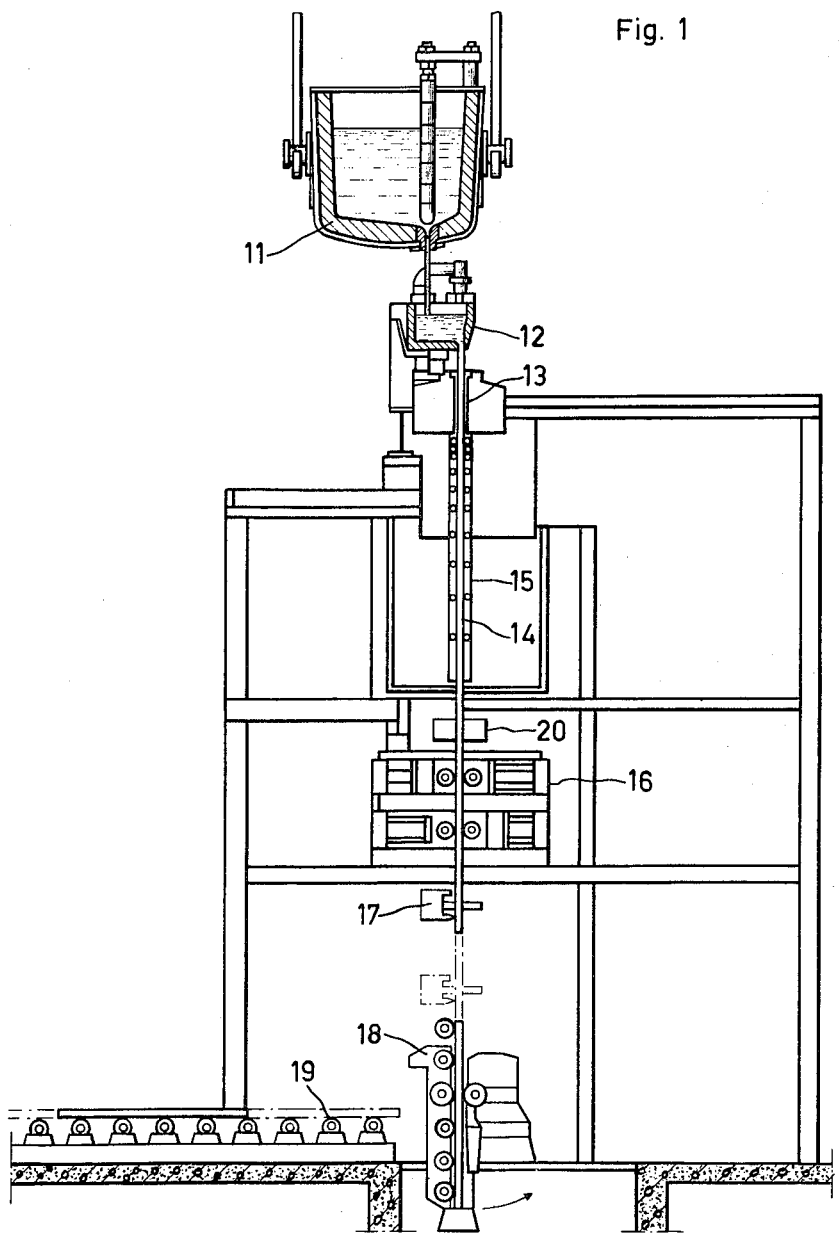

This figure represents a conventional continuous casting machine to which the invention may be applied. Reference numeral 11 designates a ladle containing liquid metal for example liquid steel that is poured into an intermediate container or tundish 12. From the tundish 12 the liquid metal is guided into an oscillating, water-cooled die 13 in which is formed a solidified external zone the so-called crust or skin. The liquid metal enclosed within this skin is generally referred to as pool or liquid core. The skin and the core together form a strand 14 which is drawn from the die 13 in well-known manner at a determinated speed first by means of a dummy-bar. Thereby the strand is cooled in a secondary cooling zone 15 through which it is guided. By the cooling to which the strand is submitted in this secondary cooling zone, it solidifies more and more, i.e. the liquid core becomes smaller and smaller. By modifying this cooling the shape of the liquid core may be influenced. The solidified strand 14 is drawn-off by a set of rollers 16. Below of this set of rollers, the strand 14 is cut into lengths by a cutting device 17. The cut parts are taken up by a receiving device 18 and tilted into horizontal position, whereafter the pieces of the strand are conveyed by rollers 19. In the range of the tip of the liquid core, there are arranged detection means 20 for ascertaining the precise position of the liquid core.

Figure 2A:
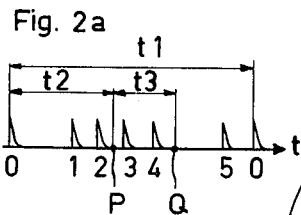
FIGURE 2a shows a sequence of pulses indicating two aggregate states.
Figure 2:
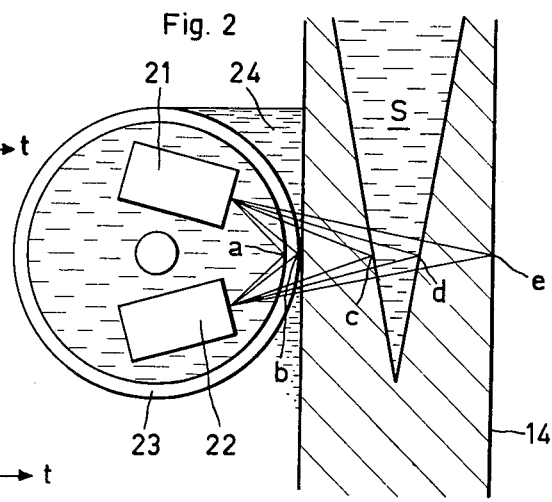
FIGURE 2 shows the arrangement of an emitter and of a receiver for carrying out the ultrasonic echo sounding method including one detection barrier.
Figure 2B:
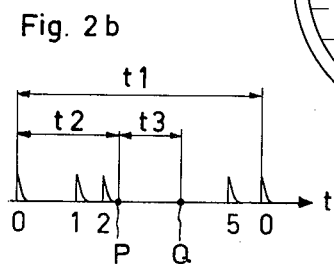
FIGURE 2b shows a sequence of pulses indicating one aggregate state.
Figure 2C:
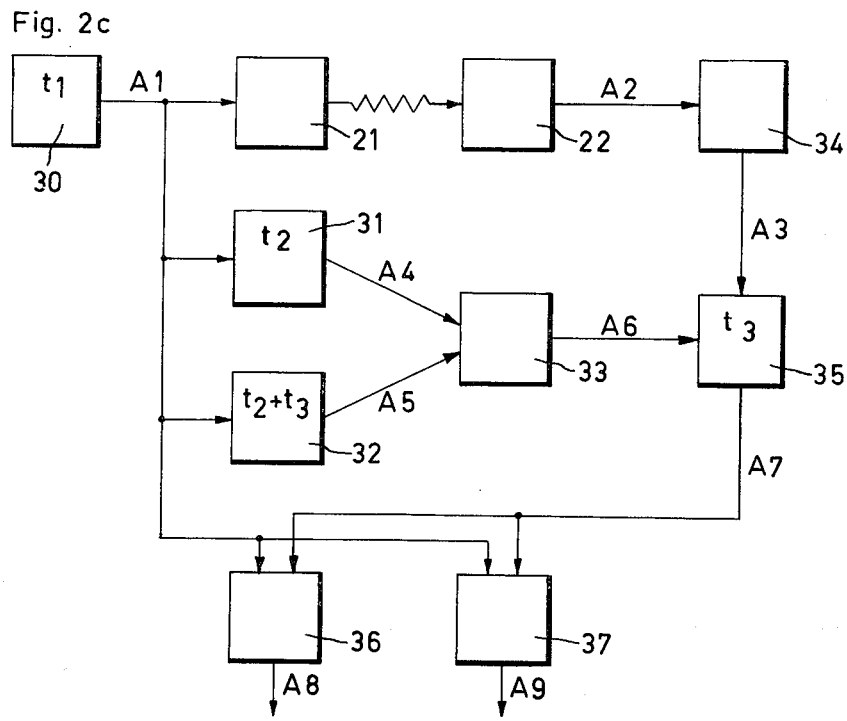
FIGURE 2c shows a block diagram illustrating the production of control pulses with the echo sounding method.
Figure 2D:
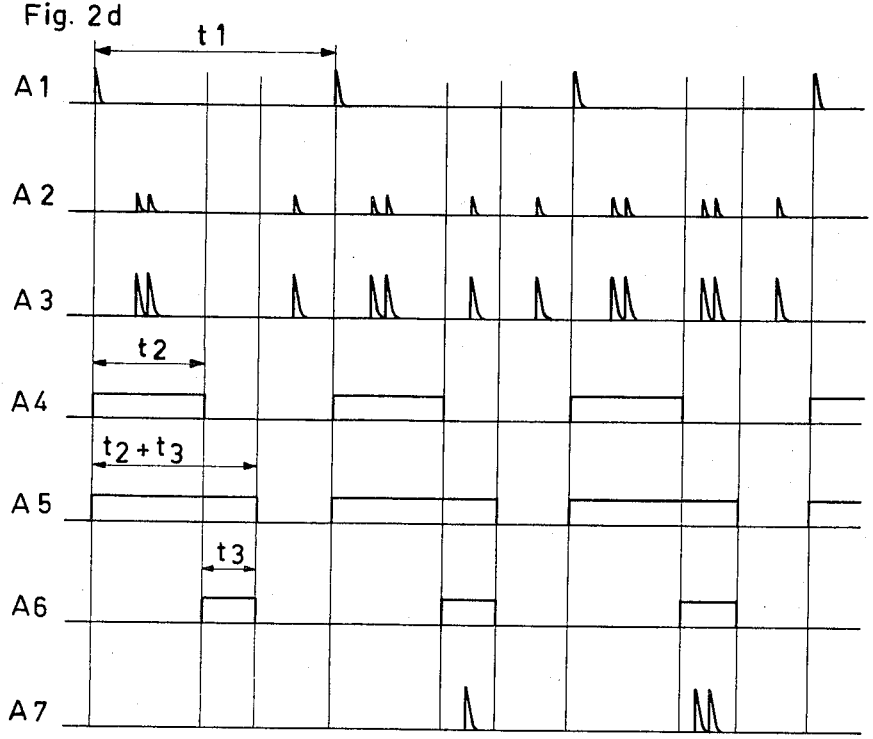
FIGURE 2d shows a series of signal forms.
Figure 2E:
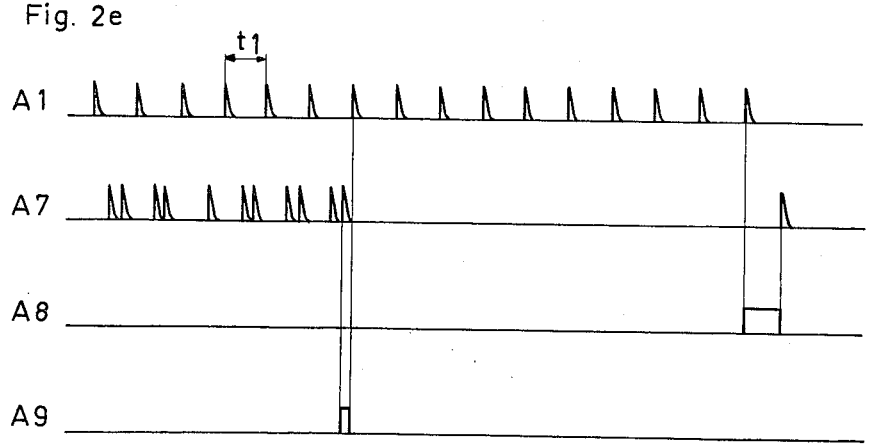
FIGURE 2e shows signal forms with reduced time axis.

FIGURES 2–2e

In FIGURE 2 the detection means 20 is shown in form of an ultrasonic emitter 21 and receiver 22 lodged in a water-cooled roller 23. This roller 23 is pressed by means of a pressure device (not represented) against the strand 14 including in its interior the liquid core S. Between the strand 14 and the roller 23 the cooling water 24 of the secondary cooling is dammed in the roller 23 and the cooling water 24 forms the coupling fluid for the ultrasonic waves between the emitter 21, the strand 14 and the receiver 22.

The emitter 21 emits ultrasonic waves in direction towards the strand 14. The waves are reflected towards the receiver 22 at the points of transition $a$–$e$ between different fluid states so that there is obtained a sequence of pulses as shown in FIGURE 2a or 2b. The emission of such waves is repeated at regular time intervals $t1$ with a pulse 0. The reflection of this pulse at point $a$ (transition from the cooling water for the roller to the roller) supplies in the receiver an echo pulse 1, at the point $b$ (transition between the roller and the strand surface) an echo pulse 2, at the point $c$ (transition from solid to to liquid steel) an echo pulse 3, at the point $d$ (transition from liquid to solid) an echo pulse 4 and at the point $e$ (strand surface) an echo pulse 5. The impact of the pulses on the receiver 22 takes place at time intervals $t$. The time interval between the emission of pulse 0 and the receipt of the echo pulses is a measure for the distances covered by the waves. When the pulses 3 and 4 (FIGURE 2a) arrive this indicates that the strand 14 includes two different aggregate states, i.e. that a liquid core is present. When the pulses 3 and 4 are missing (FIGURE 2b) then the strand has one aggregate state only. If only one pulse appears or if two pulses are so close together that they cannot be separated, then the lowest point of the liquid core will be at the desired point or level. In order to ascertain whether the said pulses 3 and 4 arrive or not, it is necessary to introduce further internal control time intervals $t2$ and $t3$. The time interval $t2$ corresponds to the interval between the emission of pulse 0 and an assumed time point P between the echo pulses 2 and 3, while the time interval $t3$ extends from said point P to an assumed time point Q between the pulses 4 and 5.

The pulse sequences according to FIGURES 2a or 2b are evaluated to produce control signals corresponding to the position of the core tip, in a circuit shown in form of a block diagram in FIGURE 2c.

The signal forms appearing at the outlets of the blocks are shown in FIGURES 2d and 2e, whereby it is assumed for the signal sequence at the left that the core tip is too high with respect to a selected position (point of the detection barrier) and for the signal sequence at the right, it assumed that the core tip is too low with respect to the selected position. The signal sequence in the middle indicates the correct position of the core tip.

A pulse generator 30 produces at its outlet A1 the tension pulse 0 which, as already mentioned, is repeated at regular time intervals $t1$. These tension pulses 0 on the one hand act onto an ultrasonic emitter 21, for example onto an emitter with an oscillating quartz and on the other hand onto time elements 31 and 32. In the emitter 21 these pulses are transformed into ultrasonic waves. The time elements 31 and 32 are switched-in by the pulses A1 of the generator 30 during the time intervals $t2$ and $(t2+t3)$, respectively and they issue at their outlet signals A4 and A5, respectively. The signals A4 and A5 of the time elements 31 and 32, respectively, act onto a 0–1-implication member 33 producing at its outlet a signal A6 only when at its inlet the signal A4 is "ZERO" and simultaneously the signal A5 is "ONE." The signal A6 thus extends over the time interval $t3$.

The echo pulses 1–5 are received by the receiver 22, which may be a dynamical microphone. The outlet signals A2 of the receiver 22 are amplified by an amplifier 34 to a level A3. The signals A3 and the signal A6 act onto a gate 35. The signal A3 may appear at the outlet of the gate 35 as signal A7 only when the signal A6 with the value "1" is present. Consequently pulses may pass through the gate 35 only during the time interval $t3$, i.e. the echo pulses 3 and 4 which are contained in the outlet signal A7 may pass. The signal A7 thus is a value for the position of the core tip. In order to ascertain this position a number of pulses of signal A7 are compared with the emitting pulse A1. To this end pulse counters 36, 37 are provided. In the counter 36 the inlet signal A1 results in an addition and the inlet signal A7 in a subtraction of the pulses. On the contrary in the counter 37 the inlet signal A7 results in an addition and the inlet signal A1 in subtraction of the pulses.

The dendrities which form during the solidification as well as other irregularities may lead to fluctuations of the pulse number at signal A7. Such fluctuations would result in a certain instability of the control particularly if one sole excess pulse in the counters 36, 37 would directly release corresponding control functions. It is therefore advantageous to observe the pulses over a certain period and to order an adjustment of the machine only as a result of a certain excess of pulses. To this end, each of the counters 36 and 37 is provided with a preselection whereby a signal A8 and A9, respectively, may only appear when the pre-selected value is exceeded, for example in FIGURE 2e when it exceeds 5. The signals A8 and A9 thus constitute a reference for the core tip with respect to the selected position to indicate whether the actual position of the core tip is too high or too low, respectively. If no signals A8 and A9 appear, this indicates that the core tip is at the correct desired position.

In the embodiment which just has been described, the position of the core tip is measured continuously. In order to avoid an instability of the control that may result therefrom, it is suggested to determine these signals at regular time intervals. This may be obtained by switching a time element (not represented) into the circuit before the pulse generator 30, which switches-in the generator for a short time only and leaves it switched-off hereafter a longer period.

The time interval between the echo pulses 3 and 4 of FIGURE 2a may be further evaluated by taking further control steps when a certain selected distance which constitutes a measure for the size of the liquid core is exceeded. For example, a too great distance would indicate that the core tip might descend into the range of the cutting device 17. The indication of such a distance might therefore be transformed into a safety signal the appearance of which would immediately reduce the withdrawal speed so as to prevent the core tip reaching the zone of the cutting device.

Figure 3:
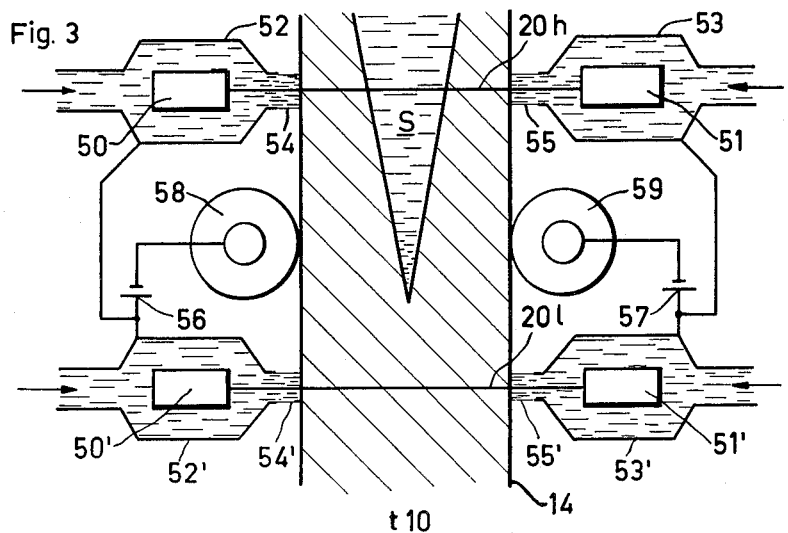
FIGURE 3 shows the arrangement of emitter and receiver for carrying out the ultrasonic method of penetration including two detection barriers, a coupling by water jets and ionization of the vapor layer.

FIGURES 3–3f

FIGURE 3 illustrates the method of penetration with two detection means 20. An emitter 50 and a receiver 51 are each lodged in a water container 52 and 53, respectively. Each of these containers 52 and 53 is provided with a jet nozzle by means of which it is possible to direct a jet of cooling water 54 and 55, respectively under such pressure against the strand 14 that this jet may be used as coupling means for transmitting ultrasonic waves to the strand.

In order to reduce the influence of the phenomenon of Leidenfrost, sources of current 56 and 57 are connected on the one hand, with water housings 52 and 53, respectively, which are electrically insulated from the strand, and on the other hand with the contact rollers 58 and 59, respectively. Between the cooling water jets 54 and 55, respectively, and the hot surface of the strand a vapor film or layer is formed. This hot surface and the jets of water 54 and 55, respectively, serve as electrodes separated from each other by the vapor film acting as insulator. By applying a voltage between the electrodes a high electrical field strength is produced in the very thin vapor film leading to gas discharges. Thereby the vapor molecules are ionized and wander back in the liquid. By adjusting the applied voltage it is possible to reduce the vapor film to zero so that the transmission of ultrasonic waves is not hindered anymore.

The described emitter and receiver arrangement forms an upper detection barrier $20h$. A further similar arrangement is provided as lower detection barrier $20l$ and provided with similar reference numerals. The selected range in which the core tip is required to be, is to be found between these two barriers, i.e. the barriers form the limit of the selected range. The device for reducing the phenomenon of Leidenfrost serves to both detection means.

The emitters 50 and 50' emit ultrasonic waves in direction to the strand 14 and to the receivers 51 and 51' respectively. There are formed pulse sequences according to FIGURES 3a, 3b and 3c. The emission of these waves takes place at regular time intervals $t10$ by means of a pulse 0'. The impact of a pulse 1' or 2', representing the emission pulse 0' delayed by its passage through the material of the strand, on a receiver 51 or 51', respectively, takes place after a time interval $t$. This interval between the emission of the pulse 0' and the receipt of the pulse 1' or 2' thus constitutes a measure for the size of the liquid core S at both reference points.

In order to ascertain the precise position of the core tip it is necessary to introduce further time intervals $t20$, $t30$ and $t60$. The time interval $t20$ represents the interval from the emission pulse 0' to an assumed time point R while the time interval $t30$ extends from this time point R to an assumed time point M. The time interval $t60$ begins at point M and ends at an assumed time point U situated shortly after the emission pulse 0'.

Figure 3A:
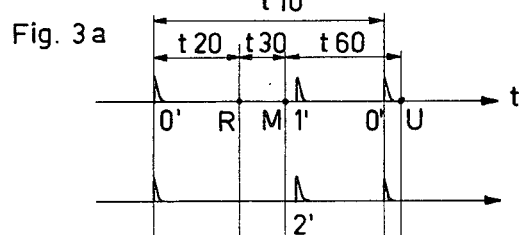
FIGURES 3a–3c show sequences of pulses.
Figure 3B:
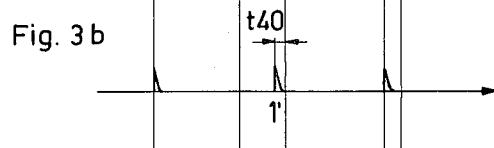
Figure 3C:
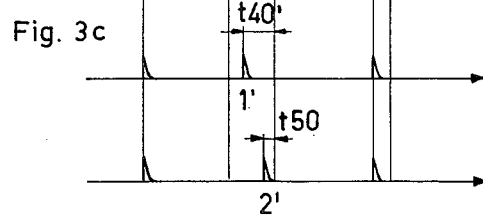

FIGURE 3a illustrates the case in which the core tip is too high with respect to the position of the detection barrier $20h$. Analogously FIGURE 3c illustrates the case in which the core tip is situated too low with respect to the detection barrier $20l$. In FIGURE 3b the core tip is situated between the barriers $20h$ and $20l$. The appearance of a time $t40$ in FIGURE 3b or of a time $t4'$ in FIGURE 3c indicates the presence of a liquid core at the barrier $20h$. The appearance of a time $t50$ in FIGURE 3c indicates the presence of a liquid core at the barrier $20l$. The time intervals $t40$ and $t40'$ extend from pulse 1' to the time point M while the time interval $t50$ extends from pulse 2' to this time point M. The mentioned time intervals are proportional to the dimension of the core. If pulse 1' of FIGURE 3a arrives after the time point M this indicates that there is no liquid core at the barrier $20h$. If the pulse 2' of FIGURES 3a and 3b arrives after time point M this indicates that there is no liquid core at the barrier $20l$.

The pulse sequence according to FIGURES 3a, 3b and 3c is now transformed according to the block diagram of FIGURE 3d into control signals corresponding to the position of the core tip. The associated signal forms are shown in FIGURES 3e and 3f, whereby for the signals represented at the left there is assumed that the core tip is too high and for the signals at the right it is assumed that the core tip is situated too low. The signal sequence in the middle indicates the correct desired position of the core tip.

The evaluation of the pulse sequences according to FIGURES 3a, 3b and 3c is effected in the same manner as has already been described for FIGURE 2c, whereby a ferromagnetical vibrator is used in the emitters 50, 50' in lieu of the oscillating quartz in the emitter 21 and a crystal microphone is used in the receivers 51, 51' in place of the dynamical microphone in the receiver 22. In contradistinction to FIGURE 2c the signals A7 and A7' as well as the signal A1 are guided to the counters 36 and 37, respectively, not directly but through further elements.

The signal A7 produces the switch-in of a bistable sweep stage 39. Similarly signal A7' switches-in a bistable sweep stage 39'. The switching-off of the sweep stages is effected by a signal B12 obtained in the following manner. The signal A6 is transformed by a NOT-gate 40 into a signal B10 which in turn is brought to shape B11 by a differentiating member 41. A rectifier 42 cuts off the negative portion of signal B11 so that signal B12 is produced.

The signal B13 with its switch-in time $t40$ and $t40'$ acts onto an OR-gate 43 which is also acted upon by the signal B13' with the switch-in time $t50$. The OR-gate 43 supplies an outlet signal B15 only if either the signal B13 or the signal B13' is present. This signal B15 similarly to the signal A7 in FIGURE 2c acts onto the counters 36 and 37. The signal A1 further influences a gate 44 which lets pass it to form an outlet signal B14 only if a signal B20 is present. The signal B14 acts onto the counters 36 and 37, similarly to the signal A1 of FIGURE 2c.

The signal B20 is produced as follows: The signals B13 and B13' act onto a stroke gate 45 supplying at its outlet a signal B16 only provided that signal B13 or B13' disappears. The signal B16 is brought by a differentiating member 46 to the shape B17 and a rectifier 47 cuts off its negative portion. The thus produced signal B18 switches-in the time element 48 for the time interval $t60$. The outlet signal B19 of this time element is guided to a NOT-gate 49, the outlet signal B19 of this time element is guided to a NOT-gate 49, the outlet signal B20 of which actuates, as mentioned, the gate 44.

In analogy to FIGURE 2e the counter 36 supplies an outlet signal B8 and the counter 37 an outlet signal B9 when the preselected value (according to FIGURE 3f, for example 5) is exceeded. The signals B8 and B9 thus constitute references for the core tip with respect to the mentioned detection barriers $20h$ and $20l$. If no signals B8 and B9 appear, then the core tip is situated between these two barriers.

Figure 4C:
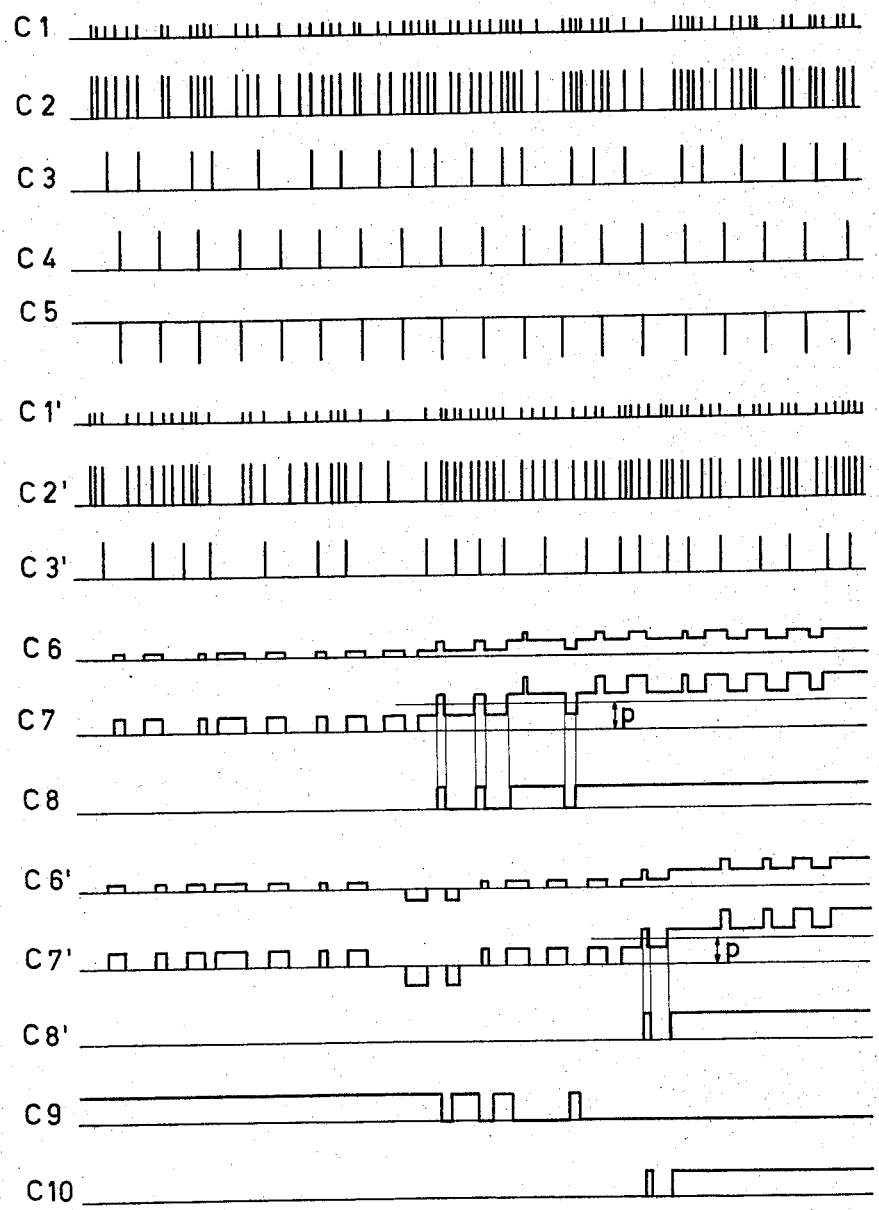
FIGURE 4c shows forms of signals.

FIGURES 4—4c

FIGURE 4 illustrates the penetrating method with two detection means 20. A source of rays 70, for example, a C0-60 source is arranged on one side of the strand 14. The rays emitted by the source 70 penetrate through the strand and reach a radio-activity responsive element 71, for example a Geiger counter. In order to protect this counter 71 from heat, it is surrounded by a cooling mantle 69. The gamma-rays emitted by the source 70 penetrate through the strand 14 and are transformed in the Geiger counter 71 into a continuous pulse sequence having as parameter the time $t$ according to FIGURE 4a. The rate of admission of the gamma-rays in the Geiger counter 71 varies with modifications of the density in the penetrated strand 14 and more particularly with any modification of the position of the core tip.

The described emitting and receiving arrangement forms the upper detection barrier $20h$. A further similar arrangement is provided as lower detection barrier and provided with similar reference numerals.

The evaluation of the pulse sequences of FIGURE 4a is effected according to the block diagram of FIGURE 4b. The signal forms appearing at the outlets of the blocks are shown in FIGURE 4c, whereby on the left side thereof the core tip is assumed to be too high and on the right side it is assumed to be situated too low. The pulses C1 supplied by the Geiger counter 71 are amplified to a level C2 by means of an amplifier 72. Analogously the pulses C1' supplied by the Geiger counter 71' are amplified to a level C2' by means of an amplifier 72'. These outlet pulses C2 and C2' act onto pulse transformers 73 and 73', respectively, which let pass only a predeterminated part of the pulses, in the represented example only each third pulse. The average number of outlet pulses of the pulse transformers in a time interval $t$ for each transformer represent a measure for the size of the liquid core. In order to ascertain therefrom the precise position of the core tip, a signal C5 with a predeterminated pulse frequency is produced. To this end there is provided a generator 74 producing a signal C4 acting onto a NOT-gate 75 supplying at its outlet the mentioned signal C5. The signals C3 and C3' as well as the signal C5 are supplied to integrating members 76 and 76', respectively. The outlet signals C6 of the integrating member 76 and C6' of the integrating member 76' are produced as follows: The signal C3 results with the signal C5 owing to its opposite polarity in an addition of the voltage of a storing element contained in the integrating member 76. Analogously the signal C3' results with the signal C5 in a subtraction of the voltage of a storing element contained in the integrating member 76'. The outlet signals C6 and C6', which according to the condition will have positive or negative values, are brought to a level C7 for the signal C6 by an amplifier 77 and to a level C7' for the signal C6' by an amplifier 77'. The outlet signals C7 and C7' of the amplifiers act onto Schmitt triggers 78 and 78', respectively. An outlet signal C8 may be produced at trigger 78 only if signal C7 extends beyond a positive value $p$. Analogously an outlet signal C8' is produced at trigger 78' only when the signal C7' extends beyond this value $p$. The signals C8 and C8' act on the one hand onto a NOR-gate 79 and on the other hand onto an AND-gate 80. An outlet signal C9 can be produced at gate 79 only provided that the signals C8 and C8' disappear simultaneously, while an outlet signal C10 can be produced at gate 80 only provided both signals C8 and C8' are present simultaneously. Thus the outlet signal C9 indicates the reference "CORE TIP TOO HIGH" and signal C10 forms the reference "CORE TIP TOO LOW." If both signals C9 and C10 disappear, this means that the core tip is situated between the two detection barriers 20h and 20l.

Should one of the signals C6 or C6' show a negative value, which case is not evaluated in the present example, the frequency of sequence of the generator 74 is selected too small with regard to the requirements of the material. With such a negative value it could be possible, for example, to correct the sequence frequency of the generator 74.

FIGURES 5–5b

FIGURE 5 illustrates a method based on the electrical conductivity including two detection means 20. Pairs of contact rollers 90, 91 and 90', 91', respectively, are pressed against the strand 14 and are supplied with electrical current from an evaluation circuit 92 passing through the strand 14. In accordance with the position of the core tip the electrical resistance between the contact rollers will change. The pair of contact rollers 90, 91 and 90', 91' with the resistance formed thereinbetween by the strand constitute an upper detection barrier 20h and a lower detection barrier 20l, respectively.

The evaluation circuit is shown in form of a block diagram in FIGURE 5a. All signal forms appearing at the outlet of the blocks are shown in FIGURE 5b.

A resistance measuring bridge 94 in form of a Wheatstone or Thomson bridge is supplied from a rectangular generator 93 the output signal of which is designated by D1. In a branch of the bridge is contained the resistance produced by the strand 14 between the contact rollers 90 and 91. The other branch of the bridge contains the resistance formed by the strand 14 between the contact rollers 90' and 91'. The outlet signal D2 of this bridge indicates by its phase position and its amplitude whether the core tip is situated too high with respect to the detection barrier 20h or too low with respect to the detection barrier 20l. Whenever, no signal D2 appears, i.e. when the bridge 94 is in equilibrium, the core tip will be situated between the two detection barriers.

In order to transform the A.C. bridge signal D2 into a continuous signal the alternate voltage D2 is fed to an amplifier 95 the outlet signal D3 of which on the one hand acts onto a limiting stage 96 adapted to limit the amplitude of signal D3 to a predetermined value $b$ and on the other hand onto a Grätz rectifier 97. The outlet signal D4 of the limiting stage 96 leads to a gate stage 98 supplying an outlet signal D5 only when the outlet signal D6 of the rectifier 97 attains a predetermined value $s$. This last-mentioned value must be selected in such manner, that the gate stage 98 is opened only when the inlet signal D4 is already limited by the element 96. The outlet signal D5 acts onto phase discriminators 99 and 100. Further the phase discriminator 100 is also acted upon by the outlet signal D1 of the rectangular generator 93. Further the phase discriminator 99 receives the outlet signal D7 of a NOT-gate 101, to the inlet of which is fed the signal D1. The discriminators 99 and 100 have the property to produce an outlet signal D8 and D9, respectively, only when both their inlet signals have equal phases. If the phases are not equal or if a phase falls out, no outlet signal is produced. The appearance of an outlet signal D8 is to be read as "CORE TIP TOO HIGH WITH RESPECT TO DETECTION BARRIER 20h" and of an outlet signal D9 as "CORE TIP TOO LOW WITH RESPECT TO DETECTION BARRIER 20l." If no signal appears the core tip is situated between the detection barriers.

In FIGURES 2–5 signals for the position of the core tip with respect to the detection barriers 20h and 20l are produced. In the following description these signals are transformed into control signals for adjusting the machine. This transformation may be effected by hand or automatically.

For the manual control two solutions are possible. Either the signals indicating the position of the core tip may be directly brought in form of light signals to the control board of the operator. Thereby, in order to prevent a flickering of the light signals due to frequent changes in the signals it may be of great advantage to provide, as already mentioned, a timed locking of the action of the signals.

Or the signals indicating the position of the core tip may be fed to an oscillograph mounted in the control table of the die operator, whereby this position appears on the screen of the oscillograph in form of a curve. A marking brought on the screen indicates the desired position of the core tip and should the curve depart from this marking the die operator may directly make the required changes in the control.

Instead of being supplied to an oscillograph the signals representing the position of the core tip may be fed to an indicating instrument. In order to eliminate the influences of fluctuations, a marking on this instrument indicates a nominal range of position with a minimum and a maximum nominal value. Correction of the machine by the die operator takes place only when the hand of the instrument leaves this nominal range.

For the automatic transformation of the position signals the latter are fed to an evaluating circuit releasing the adjusting functions. For the next following embodiments of such an evaluating circuit an additional condition shall be introduced.

It is known, that some steel qualities are very sensitive to cracking and this cracking generally is closely related to the intensity of cooling. The temperature at the strand surface constitutes a measure for this cooling intensity and it may, for this reason and for some steel qualities be advantageous to take into consideration in the functions of adjustment, the temperature of the strand surface, this being the additional condition just mentioned before.

The production of corresponding temperature signals is fully described in the copending U.S. patent application No. 233,723, filed October 29, 1962.

Figure 6:
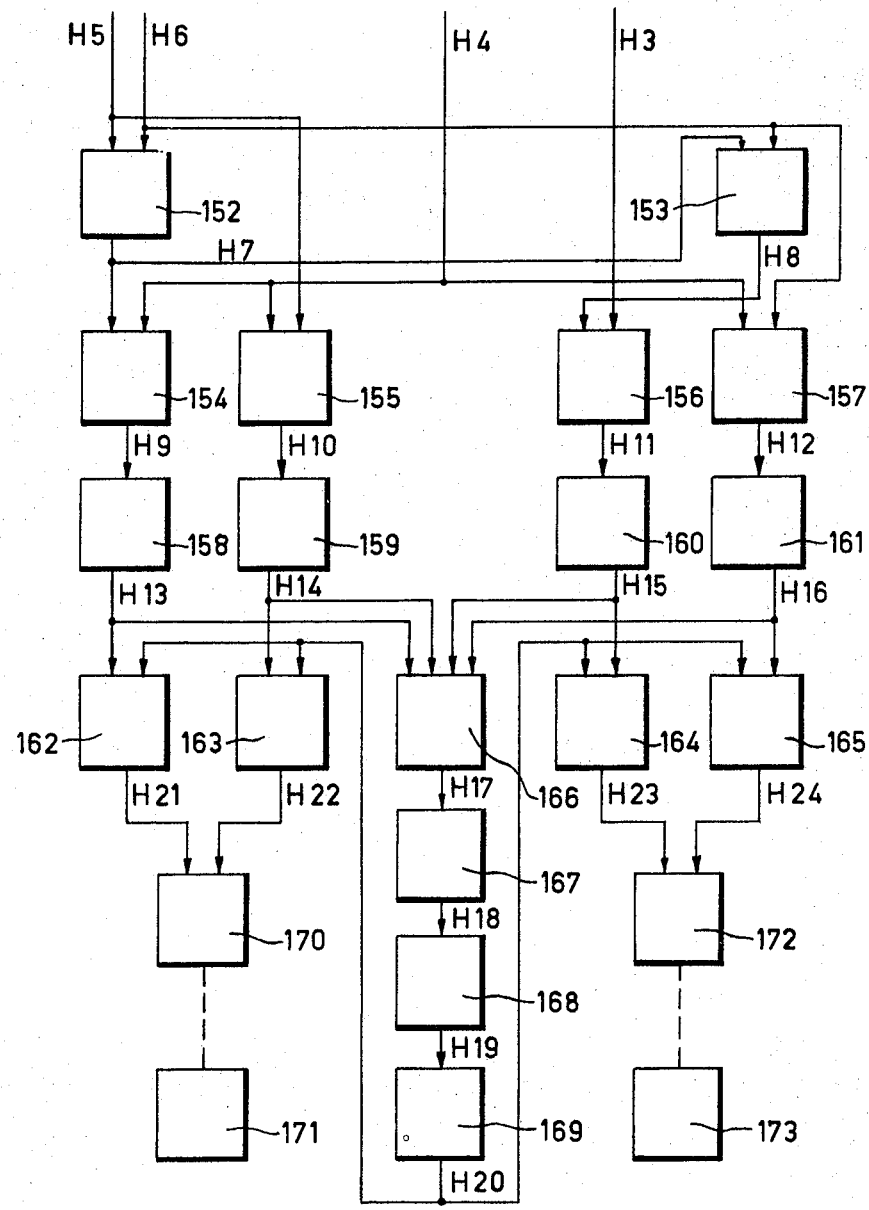
FIGURE 6 shows in a block diagram the evaluation of the pulses according to FIGURES 2 and 3.
Figure 6A:
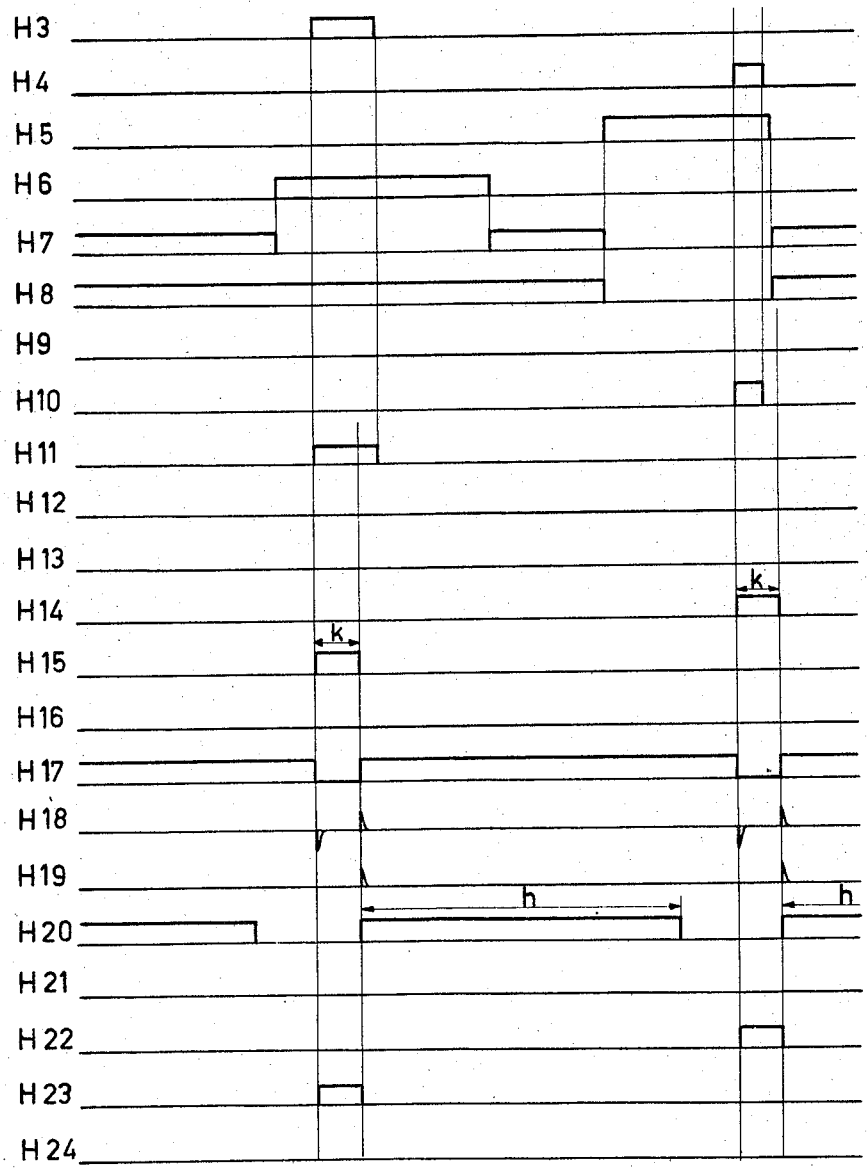
FIGURE 6a shows signal forms.

FIGURES 6 AND 6a

The evaluation of the signals produced by ultrasonic waves, for indicating the position of the core tip (FIGURES 2 and 3) and of the signals indicating deviations of the surface temperature of the strand from a nominal value is effected according to the block diagram of FIGURE 6. For the evaluation of these signals, the following adjusting functions are assumed.

(1) $\Delta T$ zero $\Delta L$=correct→no control action
$\Delta L$=too low→increase cooling
$\Delta L$=too high→increase casting speed (2) $\Delta T$ positive $\Delta L$=correct→no control action
$\Delta L$=too low→increase cooling
$\Delta L$=too high→reduce cooling (3) $\Delta T$ negative $\Delta L$=correct→no control action
$\Delta L$=too low→reduce casting speed
$\Delta L$=too high→increase casting speed.

On the left side of this table there is indicated the reference, and on the right side there is indicated the control action to follow this reference, whereby $\Delta T$ indicates deviations of the actual temperature of the strand surface from the nominal temperature and L indicates the position of the core tip. The signal forms of the different control blocks are visible in FIGURE 6a, whereby on the left side it results from the selected reference $\Delta T$=negative and $L$=too high the control action "INCREASE CASTING SPEED" and on the right side from the selected reference $\Delta T$=positive and $L$=too low the control action "INCREACE COOLING."

In FIGURE 6 the signal H3 (position of the core tip too high) corresponds to the signal A8 of FIGURE 2c or B8 of FIGURE 3d. Analogously signal H4 (core tip too low) in FIGURE 6 corresponds to signal A9 of FIGURE 2c or B9 of FIGURE 3d. The signals H5 and H6 correspond to a temperature signal $\Delta T$=positive and $\Delta T$=negative, respectively, whereby $\Delta T$ represents the deviation of the actual surface temperature of the strand from a nominal temperature.

For the logistical connection of all control signals for the carrying out of the mentioned adjusting functions there are provided a NOR-gate 152, an OR-gate 153 and AND-gates 154, 155, 156 and 157. An outlet signal H7 can be produced at gate 152 only if the signals H5 and H6 miss simultaneously. At gate 153 an outlet signal H8 will appear only provided that one of the signals H6 or H7 is present. An outlet signal H9, H10, H11, H12 may appear at gates 154, 155, 156, 157, respectively, only provided that the signals H4 and H7, H4 and H5, H3 and H8, H4 and H6, respectively, are present simultaneously.

The duration of the signals H9, H10, H11, H12 is different. For the stepwise actuation of the adjusting members it is desirable that these signals appear within a predeterminated time interval in order to obtain a constant adjusting action. To this end the signals H9, H10, H11, H12 act onto a pulse former 158, 159, 160, 161, respectively. The outlet signals H13, H14, H15, H16 of these pulse formers appear with a selective duration $k$ independently of the duration of the corresponding inlet signals. The period $k$ must be of such length that with one evaluated control order the number of pulses on the counters 36 and 37 (FIGURE 2c or 3d) is lowered beneath the pre-selected value.

A control order for the adjusting members has its effect in the strand 14 only after a certain time. In order to make inactive pulses appearing in the meantime, there is provided a locking device. This device consists of elements 166, 167, 168 and 169. The NOR-gate 166 has an outlet signal H17 only when the signals H13, H14, H15 and H16 miss simultaneously. By means of the differentiating member 167 the signal H17 is transformed into a signal H18 which has its negative portion cut-off by a rectifier 168. The thus obtained outlet signal H19 acts onto the time member 169 and switches-in the latter for the mentioned locking time $h$ resulting in the formation of the control locking signal H20.

For the production of the definitive control order the signals H13, H14, H15, H16 and the control locking signal H20 act onto 1-0-implication members 162, 163, 164, 165 respectively. Each of the implication members 162, 163, 164 and 165 supplies its outlet signal H21, H22, H23 and H24, respectively, only provided that the signal H13, H14, H15 and H16 is present and simultaneously the signal H20 disappears. The outlet signals H21, H22, H23 and H24 thus represent the control signals "INCREASE COOLING," "REDUCE COOLING," "INCREASE CASTING SPEED" and "REDUCE CASTING SPEED," respectively. The outlet signals H21 and H22 act onto a motor 170 adjusting a cooling fluid valve 171 for the secondary cooling of the strand 14. The outlet signals H23 and H24 operate a motor 172 for adjusting the field excitation 173 of a Ward-Leonard-device associated to the rollers 16. The signals H21 and H22 produce in the motor 170 a positive and negative rotation, respectively, for increasing and reducing, respectively, the amount of cooling fluid at valve 171. The signals H23 and H24 result in the motor 172 into a positive and negative rotation, respectively, for increasing and reducing, respectively, the field strength of the Ward-Leonard motor so as to modify the casting speed. This modification of the casting speed due to its connection with further parts of the machine requires further adjustment such as the die oscillation, the speed of the straightening device and of a rolling mill that may be connected after the continuous casting machine etc. All these adjustments are thus influenced by the signals signalling deviations of actual values from nominal values for the strand.

Figure 7A:
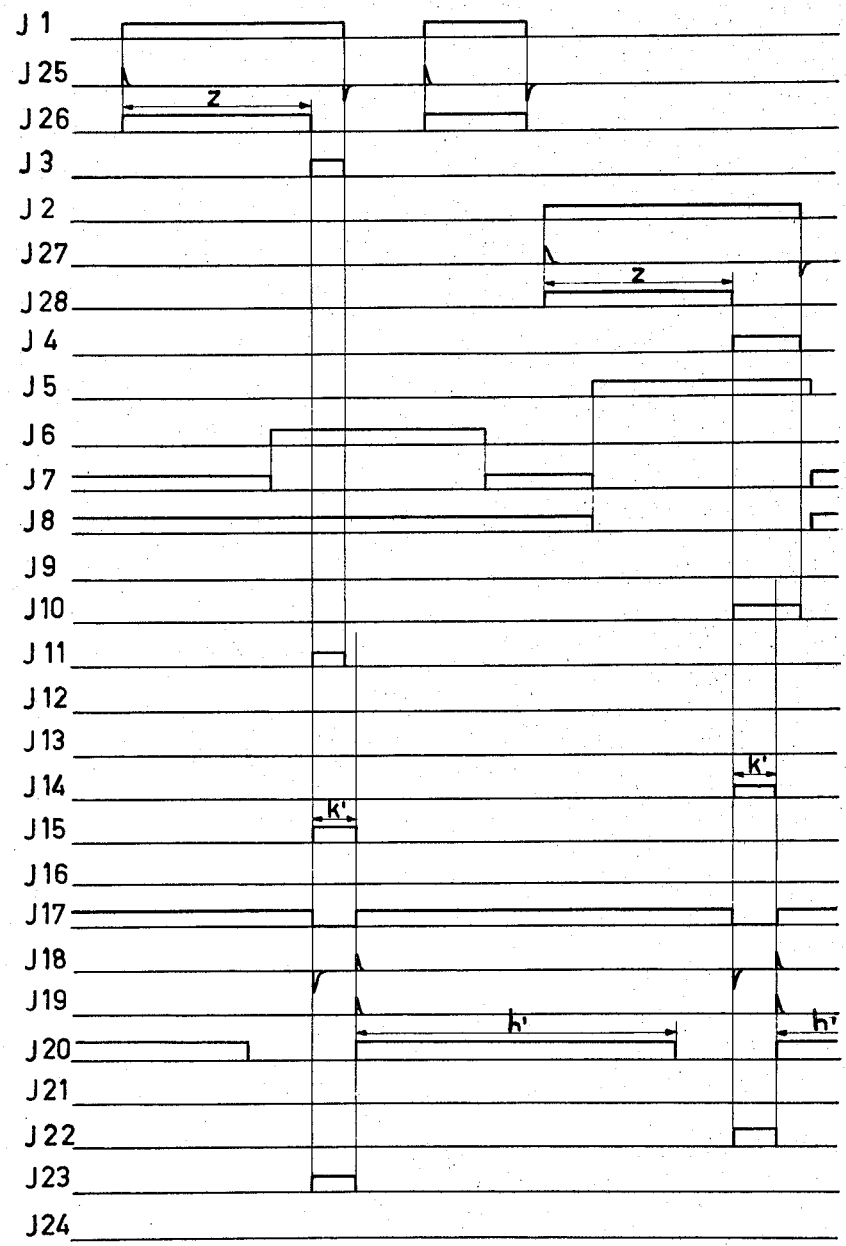
FIGURE 7a shows signal forms.

FIGURES 7 AND 7a

The evaluation of the signals produced by gamma-rays and indicating the position of the core tip (FIGURE 4) and of the signals obtained by the electrical resistance method (FIGURE 5) is effected in accordance with the block diagram of FIGURE 7. Thereby the signal J1 (position of core tip too high) and the signal J2 (core tip too low) correspond to the signals C9 and C10, respecively, of FIGURE 4b or to the signals D8 and D9, respectively, of FIGURE 5a. The signals J5 and J6 constitute the temperature signals for the strand surface. The forms of the signals of the elements of FIGURE 7 are visible from FIGURE 7a. The adjusting functions are assumed to be the same as in FIGURE 6. Also the evaluation circuit is similar with the exception that the signals J1 and J2 submitted to the influence of the solidifying front are not evaluated directly but first transformed by further switch elements into signals J3 and J4. Instead of the designation of the signals by H in FIGURE 6, in FIGURE 7 the signals are designated by J. In order to avoid instabilities in the control owing to the already mentioned irregularities in the solidification front and more particularly owing to dendrites, it is possible instead of observing several pulses to maintain one signal f a certain time and to give an order for adjustment only after this delay time is passed. This determination of time interval is effected in the following example by a time element.

The signals J1 and J2 are transformed by differentiating members 180, 183, into signals J25 and J27, respectively. The signals J25 and J27 switch-in a time element 181 and 184, respectively, which switch-off after a certain time z. If the signals J25 or J27 disappear before the time z ends the time elements 181 and 184, respectively, are switched-off immediately. The outlet signals of the time elements 181 and 184 are designated by J26 and J28, respectively. The signals J1 and J26 act onto a 1–0–implication member 182 and the signal J2 and J28 act onto a 1–0–implication member 185. At the implication members 182 and 185 outlet signals J3 and J4, respectively, may be produced only when on the one hand the signals J1 and J2, respectively, are present and on the other hand the signals J26 and J28, respectively, are missing.

It is to be observed that a time interval $k'$ identical as to its function wtih the time interval $k$ in FIGURE 6 is selected in such manner, that for each evaluated control order the signals J1 or J2, respectively, disappear.

The evaluation of the signals J3–J24 is effected in the same manner as that of the signals H3–H24 in FIGURE 6.

I claim:

1. A continuous casting plant comprising a continuous casting mold to cast molten metal poured therein into a strand having a solidified skin enclosing a molten core, means for continuously withdrawing said strand from said mold, cooling means to cool the strand issuing from said mold to progressively solidify the molten core in said strand, means to determine the position of the apex of said molten core along the longitudinal axis of said strand, and means responsive to the determination of the position of said apex for controlling the casting process to maintain the apex of said molten core at a position corresponding to the position for optimum casting speed and casting quality.

2. A continuous casting plant in accordance with claim 1 in which said apex position determining means comprises means for generating a signal, means coupling said signal generating means to said strand, and means for receiving signals reflected from interfaces within said strand to measure the position of said apex along the longitudinal axis of said strand.

3. A continuous casting plant in accordance with claim 2 which includes a receiver positioned adjacent said strand and on the same side of said strand as said signal generating means, said receiver being coupled to said strand to receive signals reflected by the interfaces in said strand.

4. A continuous casting plant in accordance with claim 2 in which said signal generation means comprise means for generating an electric signal and which includes a receiver positioned adjacent said strand on the opposite side of said strand from said generator, said receiver being responsive to the current passing through said strand to determine whether the core is molten at the position of measurement or whether the core has completely solidified.

5. A continuous casting plant in accordance with claim 2 which includes a fluid coupling, coupling said signal generator and said signal receiver to said strand.

6. A continuous casting plant in accordance with claim 2 in which said signal generating means comprises a source of ultrasonic signals, means coupling said ultrasonic signals to said strand and which includes a receiver responsive to the reflection of ultrasonic signals from interfaces between molten and solid states in said strand.

7. A continuous casting plant in accordance with claim 2 in which said coupling means comprises a jet of water sprayed on the surface of said strand, said water jet being under sufficient pressure to enable penetration of the vapor layer on the strand surface.

8. A continuous casting plant in accordance with claim 1 in which said apex position determining means comprise means for generating a signal, means coupling said signal to said strand, and means for receiving signals penetrating said strand to detect the position of said apex along the longitudinal axis of said strand.

9. A continuous casting plant in accordance with claim 8 in which said signal generator comprises a radio-active source positioned adjacent said strand so that the radiation therefrom passes through said strand in a direction transverse to the axis of said strand and which includes a receiver responsive to the received radiation penetrating through said strand for determining the existence of a molten core within said strand.

10. A continuous casting plant in accordance with claim 8 in which said signal generating means comprises a source of ultrasonic signals, means coupling said ultrasonic signals to said strand and which includes a receiver responsive to received signals penetrating through said strand for determining the existence of a molten core within said strand.

11. A continuous casting plant in accordance with claim 1 which includes means for introducing a delay between said apex position determination and said control of the casting process.

12. The method of continuous casting which comprises the steps of continuously casting molten metal into a mold, cooling said mold to solify the metal along the periphery to form a strand having a solidified skin enclosing a molten core, withdrawing said strand from said mold in continuous manner, cooling said strand to progressively solidify the molten metal in said core, determining the position of the apex of the liquid core along the longitudinal axis of said strand during the casting operation by measuring the distance between the actual position of the apex and a position predetermined for optimum casting conditions and controlling the casting process in response to the measurement to maintain the position of the apex substantial coincident with the predetermined position.

References Cited by the Examiner

UNITED STATES PATENTS

| 2,641,034 | 6/1953 | Harter | 22—57.3 |
| 2,748,290 | 5/1956 | Reichertz | 250—83.4 |
| 3,127,642 | 4/1964 | Zaeytydt | 22—200.1 X |

OTHER REFERENCES

Continuous Casting of Steel, Boichenko (Butterworths, London 1961), pp. 52, 53 and 177 relied on.

Ohmart: The Use of Gamma Radiation for Density Measurement, reprinted from Nondestructive Testing, issue of September–October 1957.

J. SPENCER OVERHOLSER, *Primary Examiner.*

MARCUS U. LYONS, *Examiner.*

R. A. SANDLER, *Assistant Examiner.*